United States Patent
Becker et al.

(10) Patent No.: US 9,777,600 B2
(45) Date of Patent: Oct. 3, 2017

(54) INSTALLATION APPARATUS AND RELATED METHODS FOR COUPLING FLOW SLEEVE AND TRANSITION PIECE

(71) Applicant: General Electric Company

(72) Inventors: Joseph Daniel Becker, Travelers Rest, SC (US); John William Herbold, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 14/730,958

(22) Filed: Jun. 4, 2015

(65) Prior Publication Data

US 2016/0356182 A1    Dec. 8, 2016

(51) Int. Cl.
*F01D 25/28*        (2006.01)
*B23P 11/02*        (2006.01)
*F01D 9/02*         (2006.01)

(52) U.S. Cl.
CPC ............ *F01D 25/285* (2013.01); *B23P 11/02* (2013.01); *B23P 2700/13* (2013.01); *F01D 9/023* (2013.01); *F05D 2230/644* (2013.01); *Y10T 29/4987* (2015.01); *Y10T 29/49323* (2015.01)

(58) Field of Classification Search
CPC ....... B23P 11/02; B23P 19/042; B23P 19/084; B23P 19/10; B23P 2700/13; B23P 11/00; B23P 19/00; B23P 19/04; F01D 25/285; F01D 25/24; F01D 25/243; F01D 9/023; F05D 2230/64; F05D 2230/644; F05D 2230/68; F05D 2230/60; F16L 33/20; F16L 33/207; Y10T 29/49901; Y10T 29/4932; Y10T 29/49323; Y10T 29/4987; Y10T 29/53978; Y10T 29/53987; B25B 27/0028; B25B 27/28; B25B 27/10; F23R 3/60; F23R 2900/00017
USPC .............................. 72/370.03, 370.1, 370.06
See application file for complete search history.

(56) References Cited

U.S. PATENT DOCUMENTS

| | | | |
|---|---|---|---|
| 2,371,393 A | 3/1945 | Horrigan | |
| 2,395,469 A | 2/1946 | Emrich | |
| 3,347,083 A * | 10/1967 | Turpin | ................ B25B 27/0028 29/229 |
| 3,466,920 A | 9/1969 | Parker | |
| 4,291,451 A * | 9/1981 | O'Neill | ............... B25B 27/0028 29/235 |
| 7,805,946 B2 | 10/2010 | Ohri et al. | |
| 8,397,512 B2 | 3/2013 | Hessler et al. | |

(Continued)

*Primary Examiner* — Christopher Besler
*Assistant Examiner* — Matthew P Travers
(74) *Attorney, Agent, or Firm* — Ernest G. Cusick; Hoffman Warnick LLC

(57) ABSTRACT

Various embodiments include approaches for installing a flow sleeve relative to a gas turbine transition piece. Some embodiments include an apparatus for coupling a gas turbine transition piece with a flow sleeve, the installation apparatus having: a radially inner ring; a plurality of expander segments extending radially outward from the radially inner ring, the plurality of expander segments each having an axially ramped segment sized to gradually expand the flow sleeve to couple with the gas turbine transition piece as the flow sleeve is moved along the plurality of expander segments; and a circumferentially disposed space separating each pair of adjacent expander segments in the plurality of expander segments.

18 Claims, 6 Drawing Sheets

(56) References Cited

U.S. PATENT DOCUMENTS

| | | |
|---|---|---|
| 8,453,326 B2 | 6/2013 | Durocher et al. |
| 8,474,298 B2 | 7/2013 | Mather |
| 8,602,675 B2 | 12/2013 | Wright |
| 8,782,865 B2 | 7/2014 | Gerengi |
| 8,839,626 B2 | 9/2014 | Saitou et al. |
| 2003/0006610 A1* | 1/2003 | Werth .................. F16L 33/225 285/243 |
| 2009/0295147 A1* | 12/2009 | London ................ F16L 57/005 285/80 |
| 2010/0031666 A1* | 2/2010 | Chokshi .................... F23R 3/06 60/760 |
| 2012/0211209 A1* | 8/2012 | Choi .................. F16L 19/086 165/178 |
| 2013/0180306 A1* | 7/2013 | Ring ..................... B21D 31/04 72/370.06 |
| 2013/0305512 A1* | 11/2013 | Green ...................... A61F 2/86 29/428 |
| 2013/0318781 A1 | 12/2013 | Mariano et al. |

* cited by examiner

INSTALLATION APPARATUS AND RELATED METHODS FOR COUPLING FLOW SLEEVE AND TRANSITION PIECE

FIELD OF THE INVENTION

The subject matter disclosed herein relates to turbomachines. More particularly, the subject matter disclosed herein relates to apparatuses and approaches for installing components in a gas turbine.

BACKGROUND OF THE INVENTION

Gas turbines typically include a compressor section, a combustion section, and a turbine section. The compressor section pressurizes air flowing into the turbine. The pressurized air discharged from the compressor section flows into the combustion section, which may be characterized by a plurality of combustors disposed in an annular array about the axis of the engine. Each of the plurality of combustors includes a combustion liner, which defines the combustion chamber of the combustor. As such, air entering each combustor is mixed with fuel and combusted within the combustion liner. The combustion liner is positioned within a flow sleeve. Hot gases of combustion flow from the combustion liner (within flow sleeve) through a transition piece to the turbine section of the gas turbine to drive the turbine and generate power.

Conventionally, it can be difficult to couple the flow sleeve to the transition piece, because the flow sleeve/transition piece interface is sealed with a split ring seal which minimizes compressor discharge air leakage into the combustion gas path. When relaxed, the split ring seal inner dimension is smaller than the outer dimension of the transition piece, and as such, the split ring seal is expanded during assembly in order to fit around the transition piece.

BRIEF DESCRIPTION OF THE INVENTION

Various embodiments of the disclosure include approaches for installing a flow sleeve relative to a gas turbine transition piece. Some embodiments include an apparatus for coupling a gas turbine transition piece with a flow sleeve, the installation apparatus having: a radially inner ring; a plurality of expander segments extending radially outward from the radially inner ring, the plurality of expander segments each having an axially ramped segment sized to gradually expand the flow sleeve to couple with the gas turbine transition piece as the flow sleeve is moved along the plurality of expander segments; and a circumferentially disposed space separating each pair of adjacent expander segments in the plurality of expander segments.

A first aspect of the disclosure includes an apparatus for coupling a gas turbine transition piece with a flow sleeve, the installation apparatus having: a radially inner ring; a plurality of expander segments extending radially outward from the radially inner ring, the plurality of expander segments each having an axially ramped segment sized to gradually expand the flow sleeve to couple with the gas turbine transition piece as the flow sleeve is moved along the plurality of expander segments; and a circumferentially disposed space separating each pair of adjacent expander segments in the plurality of expander segments.

A second aspect of the disclosure includes a method of coupling a gas turbine transition piece with a flow sleeve, the method including: inserting an installation apparatus within the transition piece, the installation apparatus including: a radially inner ring; a plurality of expander segments extending radially outward from the radially inner ring, the plurality of expander segments each having an axially ramped segment sized to gradually expand the flow sleeve to couple with the gas turbine transition piece; and a circumferentially disposed space separating each pair of adjacent expander segment in the plurality of expander segments; sliding the flow sleeve from a first end of the plurality of expander segments to a second end of the plurality of expander segments to contact the transition piece; and joining the gas turbine transition piece with the flow sleeve.

A third aspect of the disclosure includes an installation apparatus for coupling a gas turbine transition piece with a flow sleeve, the installation apparatus having: a radially inner ring; a plurality of expander segments extending radially outward from the radially inner ring, the plurality of expander segments each having: an axially ramped segment sized to gradually expand the flow sleeve to couple with the gas turbine transition piece as the flow sleeve is moved along the plurality of expander segments; and a step at an axial end of the axially ramped segment, the step sized to contact a radially inner surface of the transition piece; and a circumferentially disposed space separating each pair of adjacent expander segments in the plurality of expander segments, each circumferentially disposed space located radially outboard of the radially inner ring.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

Figure 1:
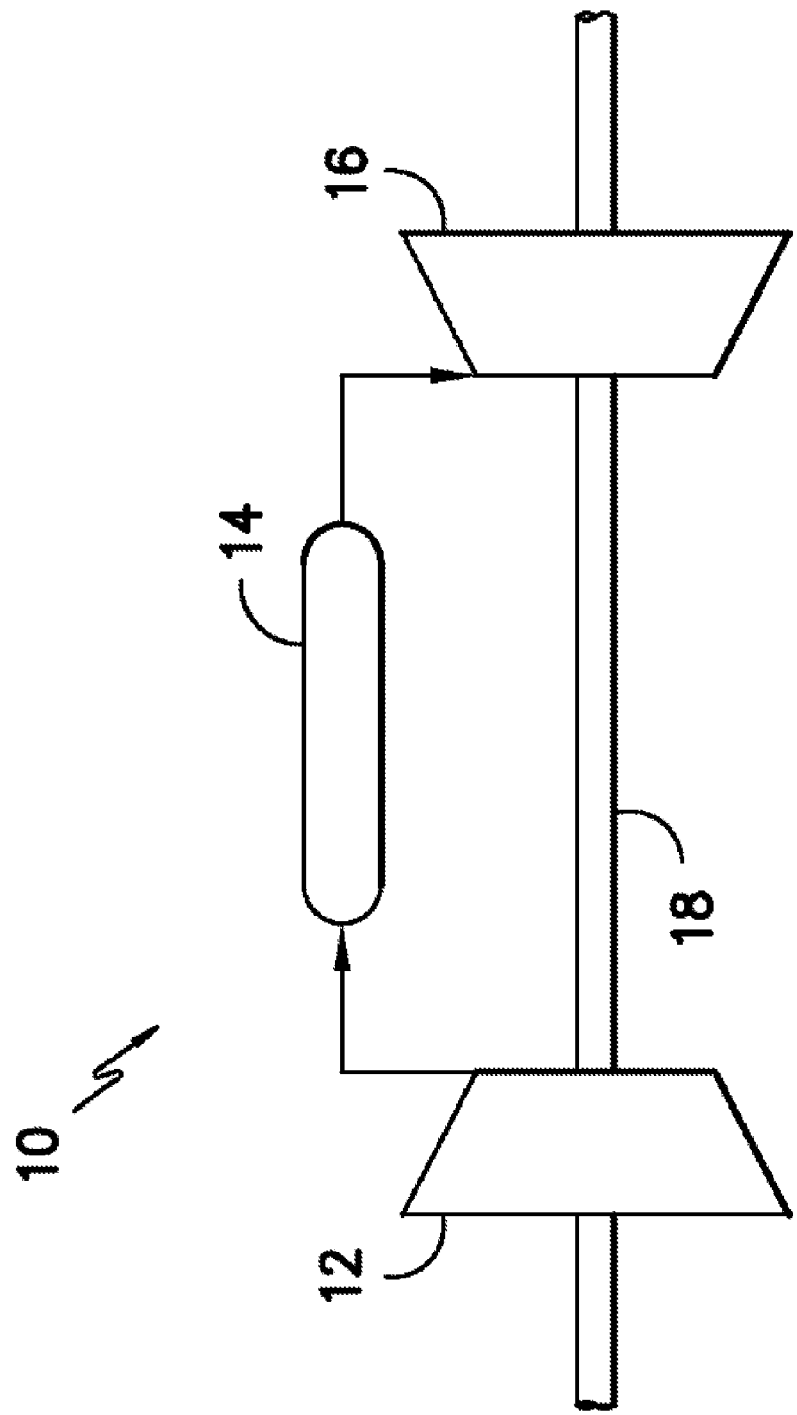
FIG. 1 illustrates a schematic depiction of a gas turbine according to the prior art.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the subject matter disclosed herein relates to turbomachines. More particularly, the subject matter disclosed herein relates to apparatuses and approaches for installing components in a gas turbine.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative of various aspects of the invention.

As used herein, the terms "axial" and/or "axially" refer to the relative position/direction of objects along axis A, which is substantially parallel with the axis of rotation of the dynamoelectric machine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

Figure 2:
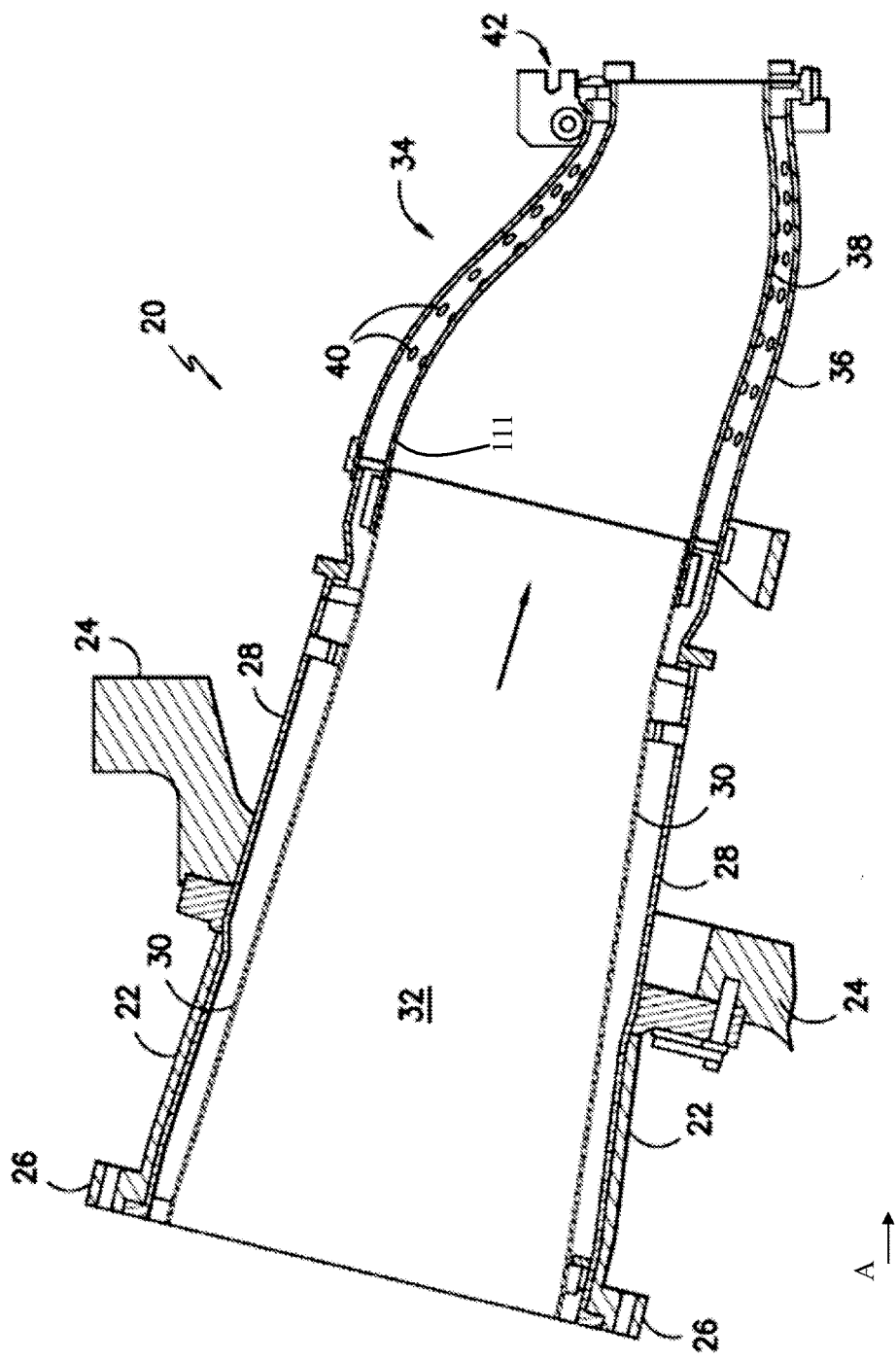
FIG. 2 shows a cross-sectional side view of an embodiment of a combustor of the combustion section of the gas turbine of FIG. 1 according to the prior art.

Referring to the drawings, FIG. 1 illustrates a schematic depiction of a gas turbine 10 according to the prior art. The gas turbine 10 includes a compressor section 12, a combustion section 14, and a turbine section 16. The combustion section 14 may include a plurality of combustors 20 (one of which is illustrated in FIG. 2) disposed around an annular array about the axis of the gas turbine 10. The compressor section 12 and turbine section 16 may be coupled by a shaft 18. The shaft 18 may be a single shaft or a plurality of shaft segments coupled together to form the shaft 18. During operation of the gas turbine 10, the compressor section 12 supplies compressed air to the combustion section 14. The compressed air is mixed with fuel and burned within each combustor 20 (FIG. 2) and hot gases of combustion flow from combustion section 14 to turbine section 16, wherein energy is extracted from the hot gases to produce work.

Referring to FIG. 2, a cross-sectional side view of an embodiment of a combustor 20 of the combustion section 14 of a gas turbine 10 is illustrated according to the prior art. The combustor 20 may generally include a substantially cylindrical combustion casing 22 secured to a portion of a gas turbine casing 24, such as a compressor discharge casing or a combustion wrapper casing. A flange 26 may generally extend outwardly from an upstream end of combustion casing 22. The flange 26 may be configured such that an end cover assembly (not illustrated) may be secured to the combustion casing 22. As is generally known, the end cover assembly may include a plurality of fuel nozzles (not shown).

The combustor 20 may also include an internal flow sleeve 28 and a combustion liner 30 substantially concentrically arranged within the flow sleeve 28. The combustion liner 30 may generally define a substantially cylindrical combustion chamber 32, wherein fuel and air are injected and combusted to produce hot gases of combustion. Additionally, both the flow sleeve 28 and the combustion liner 30 may extend, at their downstream ends, to a double walled transition piece 34, including an impingement sleeve 36 and an inner duct 38 disposed radially inwardly from the impingement sleeve 36. In particular, the combustion liner 30 may be coupled at its downstream end to the inner duct 38 such that the combustion liner 30 and the inner duct 38 generally define a flowpath for the hot gases of combustion flowing from each combustor 20 to the turbine section 16 of the gas turbine 10 (FIG. 1). Moreover, the flow sleeve 28 may be coupled at its downstream end to the impingement sleeve 36 such that the flow sleeve 28 and the impingement sleeve 36 generally define a flowpath for the pressurized air discharged from the compressor section 12 of the gas turbine 10 (FIG. 1). For example, the impingement sleeve 36 may define a plurality of cooling holes 40 configured to permit the pressurized air to enter the radial space defined between the inner duct 38 and the impingement sleeve 36.

Further, as shown in FIG. 2, one or both of the downstream ends of impingement sleeve 36 and the inner duct 38 may be coupled to a transition piece aft frame 42. As is generally understood, the aft frame 42 may be configured to attach the transition piece 34 to a first stage nozzle (not shown) of the turbine section 16 (FIG. 1) such that the hot gases of combustion flowing through the inner duct 38 may be directed into the turbine section 16.

Conventionally, it can be difficult to couple the flow sleeve 28 to the transition piece 34, because the flow sleeve 28/transition piece 34 interface is sealed with a split ring seal (not shown) which minimizes compressor discharge air leakage into the combustion gas path 32. When relaxed, the split ring seal inner dimension (ID) is smaller than the outer dimension (OD) of the transition piece 34, and as such, the split ring seal is expanded during assembly in order to fit around the transition piece 34.

In contrast to conventional approaches, various aspects of the disclosure include an installation apparatus and related method which can expand a flow sleeve and ring seal during installation of the flow sleeve. The apparatus includes an inner ring (radially inner ring) with a plurality of circumferentially spaced ramped segments extending from the outer diameter of the ring. The ramped segments allow for gradual expansion of the flow sleeve and split ring seal (not shown or described herein) to fit around the outer dimension of the transition piece. The ramped segments can also include a step at an axial end, which can be sized to fit within the inner dimension of the transition piece. In various embodiments, the apparatus can attach to the forward end of the transition piece prior to installation of the flow sleeve. In some cases, the ramped segments are separated by spaces along the circumferential outer diameter of the inner ring (of the installation apparatus). These spaces can allow for access and removal of the installation apparatus. In some other embodiments, the installation apparatus includes a handle or tab that can facilitate removal of the apparatus and/or provide notice that the installation apparatus is still in place when attempting to perform a subsequent process.

Figure 3:
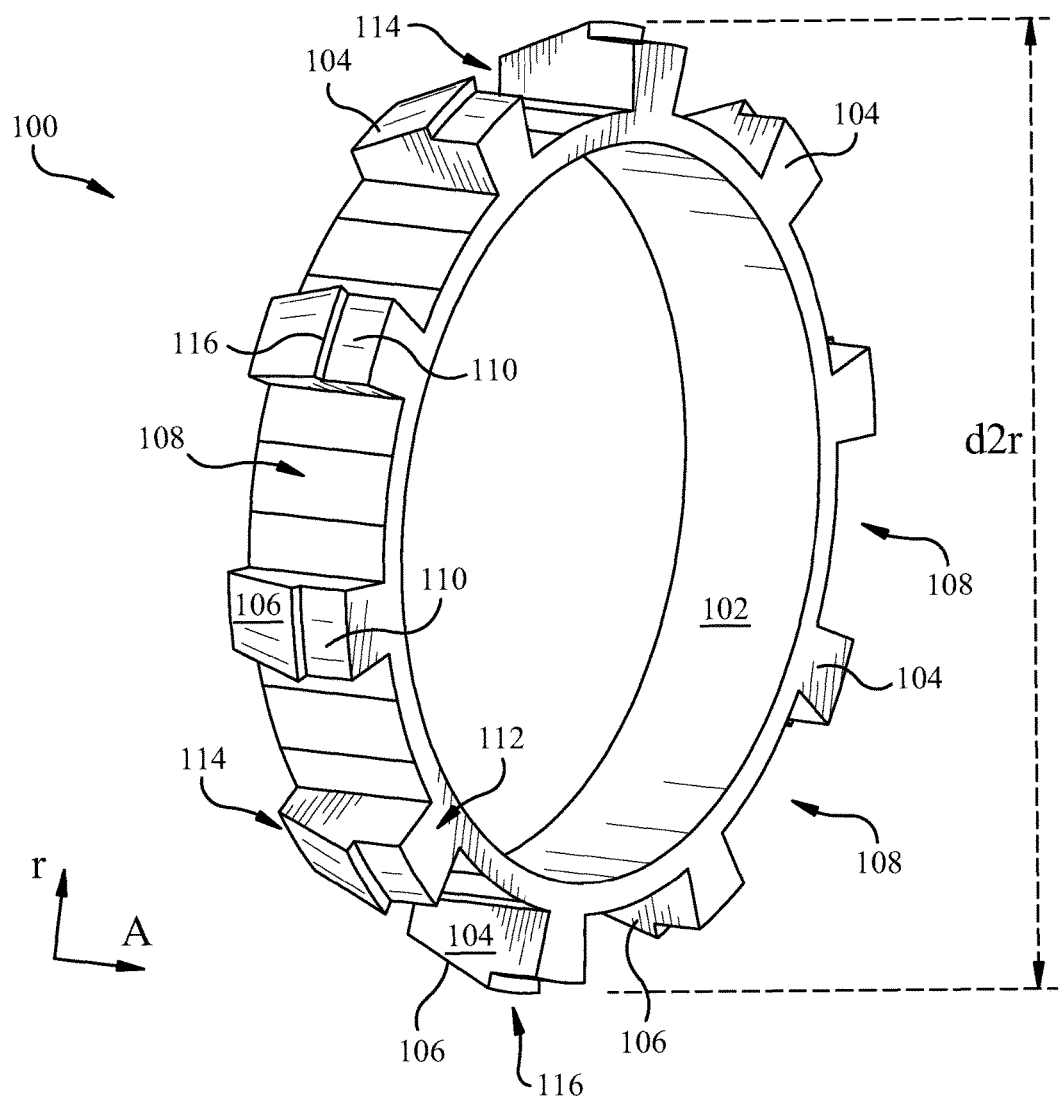
FIG. 3 shows a three-dimensional perspective view of an installation apparatus according to various embodiments of the disclosure.
Figure 4:
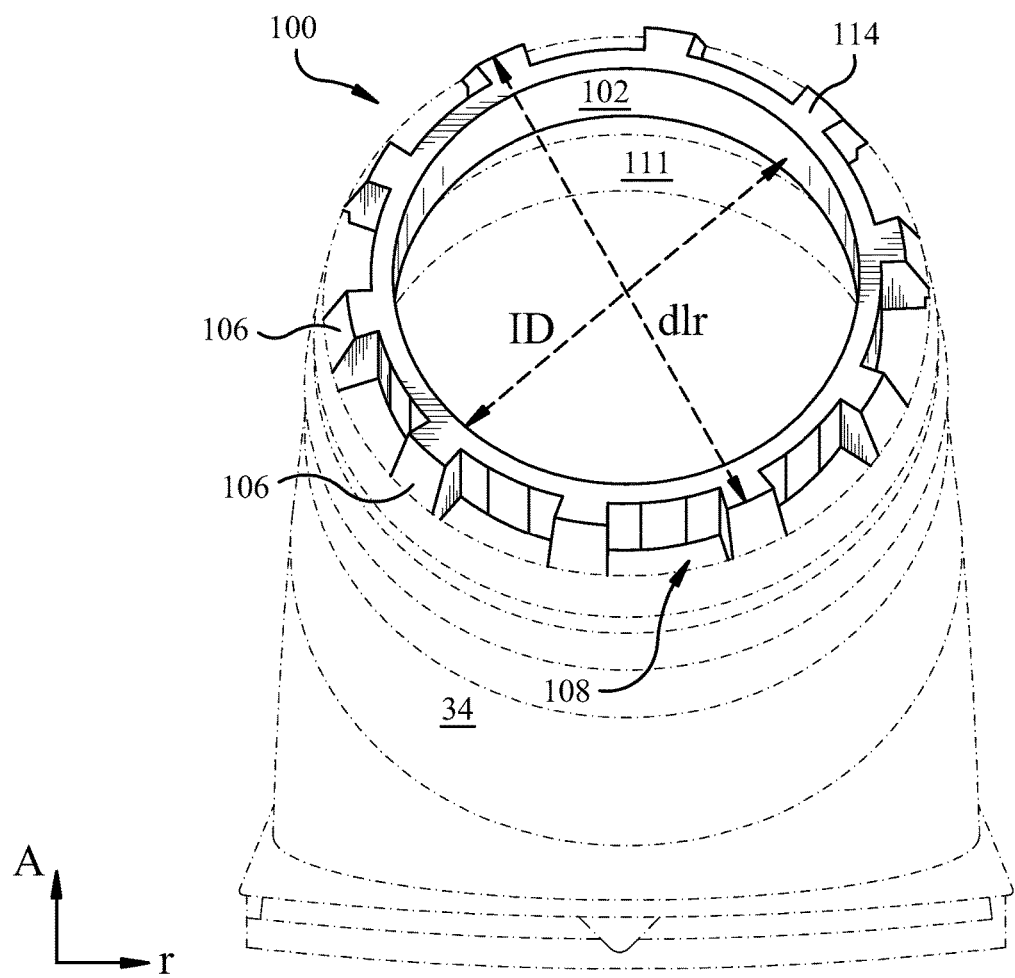
FIG. 4 shows a three-dimensional end view of an installation apparatus in conjunction with a transition piece according to various embodiments of the disclosure.

FIG. 3 shows a schematic three-dimensional perspective view of an installation apparatus 100 for coupling a gas turbine transition piece (transition piece 34, FIG. 2) with a flow sleeve (flow sleeve 28, FIG. 2). FIG. 4 shows a schematic three-dimensional end view of installation apparatus 100 engaged with transition piece 34 (e.g., during an installation process). With reference to both FIG. 3 and FIG. 4, the installation apparatus 100 can be formed of one or more pieces of metal (e.g., steel, titanium, etc.), plastics (e.g., polyurethane, polyester, epoxy resin, phenolic resins, etc.) and/or composite materials, and can include a radially inner ring 102, along with a plurality of expander segments 104 extending radially outward (r-direction) from radially inner ring 102. In various embodiments, the plurality of expander segments 104 each have an axially ramped (ramped, or sloped, in axial direction) segment 106 sized to gradually expand flow sleeve 28 to couple with gas turbine transition piece 34, as the flow sleeve 28 is moved along (e.g., around) the expander segments 104. That is, as the installation apparatus 100 is inserted in the flow sleeve 28, the flow sleeve expands as it slides along the axially ramped segments 106. The installation apparatus 100 can also include a circumferentially disposed space 108 separating each pair of adjacent expander segments 104. That is, spaces 108 separate adjacent expander segments 104 and are located radially outboard of the radially inner ring 102. In various embodiments, each circumferentially disposed space 108 is sized to allow access to the installation apparatus 100 after coupling gas turbine transition piece 34 with flow sleeve 28.

In some embodiments, expander segments 104 can be formed separately from radially inner ring 102, and may be subsequently attached (e.g., welded, brazed or otherwise bonded; clamped, pinned, screwed or otherwise attached) to radially inner ring 102 to form installation apparatus 100. In various other embodiments, expander segments 104 can be forged or cast (molded) with radially inner ring to form a substantially unitary installation apparatus 100. As used herein, the term "substantially unitary" can mean that the apparatus has a substantially consistent composition throughout all of its parts.

In various embodiments, expander segments 104 can include a step 110 at an axial end 112, where step 110 is sized to contact a radially inner surface 111 (FIG. 2, FIG. 4) of transition piece 34. In various embodiments, step 110 is positioned radially inboard (r-direction) from axially ramped segment 106, such that to move from the adjacent section of axially ramped segment 106 to step 110 is to move radially inward toward radially inner ring 102.

In various embodiments, installation apparatus 100 includes a set of substantially evenly circumferentially spaced expander segments 104, spanning the entire circumferential distance around radially inner ring 102. In other embodiments, expander segments 104 may be spaced non-uniformly around radially inner ring 102. In many cases, axially ramped segment 106 of each expander segment 104 can have a first axial end 114 at a first radial distance (d1r) (FIG. 3) from inner ring 102 and a second axial end 116 at a second radial distance (d2r) (FIG. 4) from inner ring 102, where second radial distance (d2r) is greater than first radial distance (d1r).

In various embodiments, radially inner ring 102 has an inner diameter (ID) (FIG. 4) of approximately 20-35 centimeters (approximately 8-14 inches). Further, axially ramped segment 106 can have a radially outermost point (at second axial end 116), where an outer diameter (OD) measured from the radially outermost point of opposing axially ramped segments is approximately 38-50 centimeters (approximately 15-20 inches).

Figure 5:
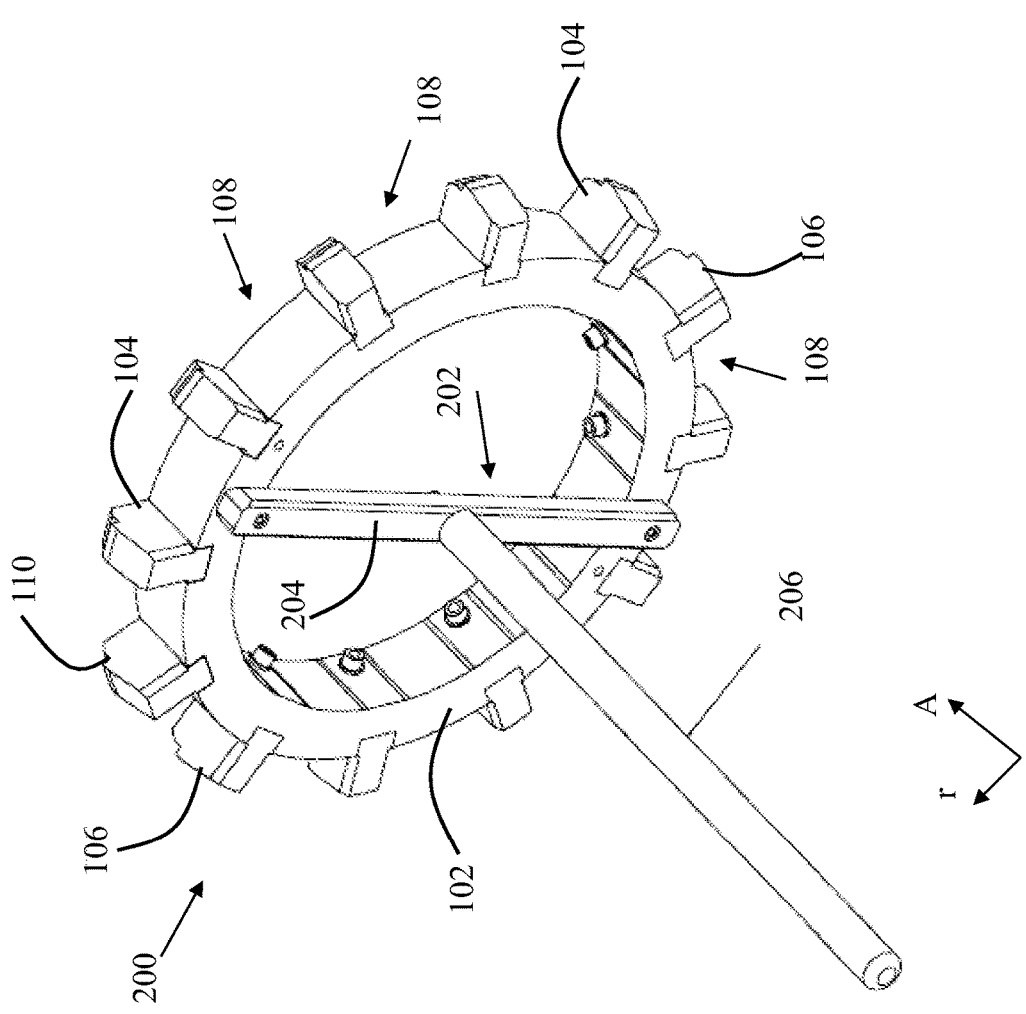
FIG. 5 shows a three-dimensional perspective view of an installation apparatus according to various additional embodiments of the disclosure.

FIG. 5 shows a schematic three-dimensional perspective view of additional embodiments of the disclosure, for example, an installation apparatus 200 including a handle 202 coupled with inner ring 102 (commonly numbered elements are substantially identical between drawings). Handle 202 can include a mount 204 coupled with inner ring 102, and an extension member 206 coupled with mount 204. In various embodiments, mount 204 can include a bar, bracket, or other member configured to attach to inner ring 102 (e.g., via bolt, screw, adhesive, etc.), and extension member 206 can include any member extending axially from mount 204, and can be sized and/or shaped to allow a human operator to grip and manipulate installation apparatus 200 using handle 202.

Figure 6:
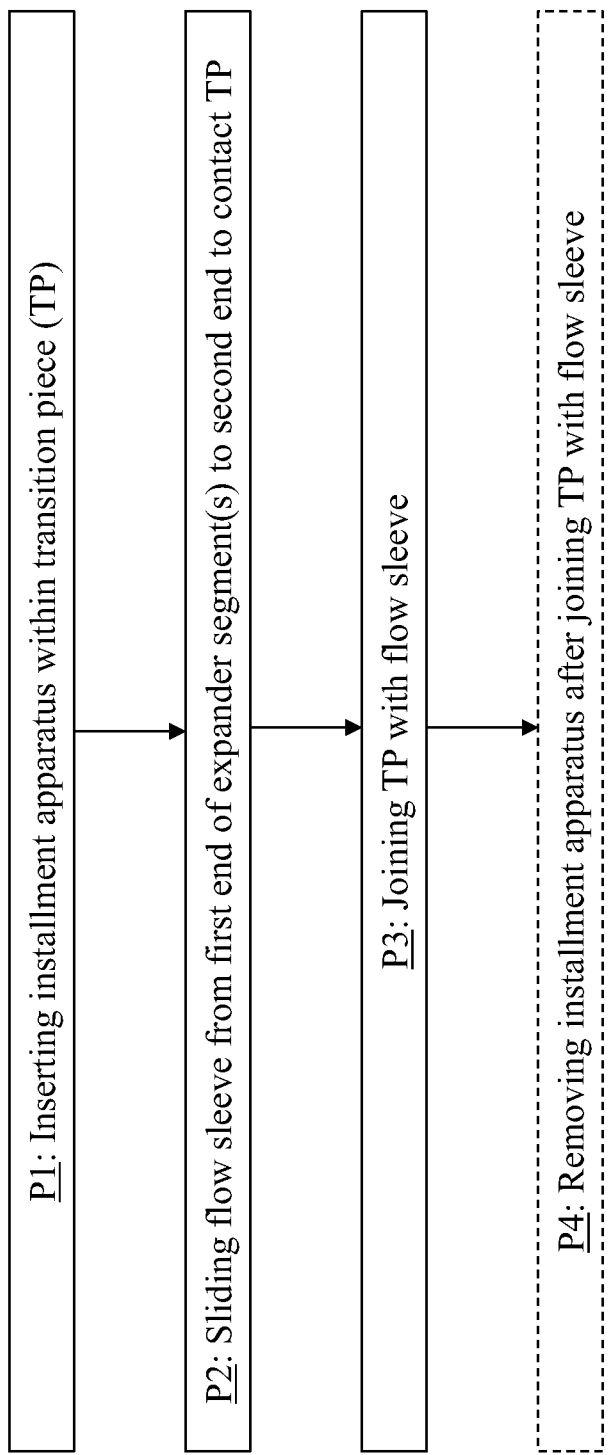
FIG. 6 shows a flow diagram illustrating processes according to various embodiments of the disclosure.

FIG. 6 shows a flow diagram illustrating a process of coupling (e.g., installing) a flow sleeve 28 with a gas turbine transition piece 34. Reference is made to FIGS. 2-5 in conjunction with this flow diagram. According to various embodiments, a method can include:

Process P1: inserting an installation apparatus (e.g., installation apparatus 100, FIG. 3, 4 or installation apparatus 200, FIG. 5) within the transition piece (e.g., transition piece 34). In various embodiments, this can include inserting the step 110 from each of the plurality of expander segments 104 inside the inner diameter of transition piece 34 such that each step 110 contacts radially inner surface 111 of transition piece 34.

Process P2: sliding the flow sleeve (e.g., flow sleeve 28) from a first end 114 of the plurality of expander segments 104 to a second end 116 of the plurality of expander segments 104 to contact the transition piece (e.g., transition piece 34). This process can include gradually pushing or pulling (e.g., by a human operator and/or other device) flow sleeve (e.g., flow sleeve 28) along ramped segment 106 toward step 110.

Process P3: joining the gas turbine transition piece 34 with the flow sleeve 28. In various embodiments, this can include bolting, fastening or otherwise joining transition piece 34 with flow sleeve 28 such that the two remain joined during the flow of combustion gases (flowing through path 32).

Process P4 (post-process, shown as optional): removing installation apparatus (e.g., installation apparatus 102, FIG. 3, 4 or installation apparatus 200, FIG. 5) after the joining of the gas turbine transition piece (e.g., transition piece 34) with flow sleeve (e.g., flow sleeve 28), e.g., using handle 202 (in installation apparatus 200) to axially remove installation apparatus. For example, after joining transition piece 34 with flow sleeve 28, a human operator may pull the installation apparatus 100, 200 out from the fore end of the flow sleeve 28. In various embodiments, handle 202 can extend in a direction such that it prevents a subsequent installation process (e.g., closure of the combustion can) while installation apparatus 200 is connected with transition piece (e.g., transition piece 34). That is, installation apparatus 200 can be designed to prevent its being unintentionally left behind within transition piece after effective installation of flow sleeve.

It is understood that in the flow diagrams shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An installation apparatus for coupling a gas turbine transition piece with a flow sleeve, the installation apparatus comprising:
   a radially inner ring;
   a plurality of expander segments extending radially outward from the radially inner ring, the plurality of expander segments each having:
      an axially ramped segment sized to gradually expand the flow sleeve to couple with the gas turbine transition piece as the flow sleeve is moved along the plurality of expander segments; and
      a step at an axial end of the axially ramped segment, the step sized to contact a radially inner surface of the transition piece, the step including:
         a radially outer-facing surface; and
         an axially facing surface interposed between the radially outer-facing surface and the axially ramped segment;
   a circumferentially disposed space separating each pair of expander segments in the plurality of expander segments; and
   a handle coupled with the radially inner ring.

2. The installation apparatus of claim 1, wherein the step is positioned radially inboard from the axially ramped segment.

3. The installation apparatus of claim 1, wherein each axially ramped segment has a first axial end at a first radial distance from the radially inner ring and a second axial end at a second radial distance from the radially inner ring, the second radial distance being greater than the first radial distance.

4. The installation apparatus of claim 1, wherein the radially inner ring has an inner diameter of 20 centimeters to 35 centimeters.

5. The installation apparatus of claim 1, wherein each axially ramped segment has a radially outermost point, and an outer diameter measured from the radially outermost point of opposing axially ramped segments is 38 centimeters to 50 centimeters.

6. The installation apparatus of claim 1, wherein each circumferentially disposed space is located radially outboard of the radially inner ring.

7. The installation apparatus of claim 6, wherein each circumferentially disposed space is sized to allow access to the installation apparatus after coupling the gas turbine transition piece with the flow sleeve.

8. The installation apparatus of claim 1, wherein the handle includes:
   a mount coupled with the radially inner ring; and
   an extension member coupled with the mount.

9. A method of coupling a gas turbine transition piece with a flow sleeve, the method comprising:
   inserting an installation apparatus within the transition piece, the installation apparatus including:
      a radially inner ring, wherein at least a portion of the radial inner ring is inserted within the transition piece;
      a plurality of expander segments extending radially outward from the radially inner ring, the plurality of expander segments each having an axially ramped segment sized to gradually expand the flow sleeve to couple with the gas turbine transition piece, and wherein at least a portion of each of the plurality of expander segments is inserted within the transition piece; and
      a circumferentially disposed space separating each pair of adjacent expander segment in the plurality of expander segments;
   sliding the flow sleeve from a first end of the plurality of expander segments to a second end of the plurality of expander segments to contact the transition piece; and
   joining the gas turbine transition piece with the flow sleeve.

10. The method of claim 9, wherein the axially ramped segment further includes a step at an axial end, the step sized to contact a radially inner surface within the transition piece during the inserting.

11. The method of claim 10, wherein the step is positioned radially inboard from the axially ramped segment.

12. The method of claim 9, wherein each ramped segment has a first axial end at a first radial distance from the radially inner ring and a second axial end at a second radial distance from the radial inner ring, the second radial distance being greater than the first radial distance, wherein the sliding includes moving the gas turbine flow sleeve along the ramped segment from the first axial end toward the second axial end.

13. The method of claim 9, further comprising removing the installation apparatus after the joining of the gas turbine transition piece with the flow sleeve, wherein each circumferentially disposed space is located radially outboard of the radially inner ring, and is sized to allow access to the installation apparatus during the removing of the installation apparatus.

14. The method of claim 9, further comprising removing the installation apparatus after the joining of the gas turbine transition piece with the flow sleeve, wherein the installation apparatus further comprises a handle coupled with the radially inner ring, the handle including a mount coupled with the radially inner ring, and an extension member coupled with the mount, the removing including engaging the handle and axially pulling the installation apparatus from the transition piece.

15. The method of claim 14, wherein the handle prevents a subsequent installation process while the installation apparatus is connected with the transition piece.

16. An installation apparatus for coupling a gas turbine transition piece with a flow sleeve, the installation apparatus comprising:
   a radially inner ring;
   a plurality of expander segments extending radially outward from the radially inner ring, the plurality of expander segments each having:
      an axially ramped segment sized to gradually expand the flow sleeve to couple with the gas turbine transition piece as the flow sleeve is moved along the
plurality of expander segments; and
a step at an axial end of the axially ramped segment, the
step sized to contact a radially inner surface of the
transition piece, the step including:
a radially outer-facing surface; and
an axially facing surface interposed between the radially outer-facing surface and the axially ramped segment; and
a circumferentially disposed space separating each pair of adjacent expander segments in the plurality of expander segments, each circumferentially disposed space located radially outboard of the radially inner ring.

17. The installation apparatus of claim 16, wherein the axially ramped segment has a first axial end at a first radial distance from the inner ring and a second axial end at a second radial distance from the inner ring, the second radial distance being greater than the first radial distance.

18. The installation apparatus of claim 16, wherein the radially inner ring has an inner diameter of 20 to 35 centimeters, wherein the axially ramped segment has a radially outermost point, and an outer diameter measured from the radially outermost point of opposing axially ramped segments is 38 centimeters to 50 centimeters, and wherein each circumferentially disposed space is sized to allow access to the installation apparatus after coupling the gas turbine transition piece with the flow sleeve.

* * * * *